United States Patent [19]

Recoque

[11] 3,774,163

[45] Nov. 20, 1973

[54] HIERARCHIZED PRIORITY TASK CHAINING APPARATUS IN INFORMATION PROCESSING SYSTEMS

[75] Inventor: Alice Maria Recoque, Chatenet-Malabry, France

[73] Assignee: Compagnie Internationale Pour L'Informatique, Louveciennes, France

[22] Filed: Apr. 5, 1972

[21] Appl. No.: 241,205

[52] U.S. Cl. .............................................. 340/172.5
[51] Int. Cl. .............................................. G06f 9/18
[58] Field of Search .................................. 340/172.5

[56] References Cited

UNITED STATES PATENTS

| | | | |
|---|---|---|---|
| 3,286,236 | 11/1966 | Logan et al. | 340/172.5 |
| 3,226,694 | 12/1965 | Wise | 340/172.5 |
| 3,286,239 | 11/1966 | Thompson et al. | 340/172.5 |
| 3,293,610 | 12/1966 | Epperson et al. | 340/172.5 |
| 3,491,339 | 1/1970 | Schramel et al. | 340/172.5 |
| 3,508,206 | 4/1970 | Norberg | 340/172.5 |
| 3,614,740 | 10/1971 | Delagi | 340/172.5 |
| 3,643,229 | 2/1972 | Stuebe et al. | 340/172.5 |

*Primary Examiner*—Gareth D. Shaw
*Assistant Examiner*—John P. Vandenburg
*Attorney*—Solon B. Kemon et al.

[57] ABSTRACT

In an information processing system adapted to perform a plurality of tasks of hierarchized priorities, a task is interrupted when another task of higher priority is initiated and cascaded interruptions of this kind normally occur. Each time a task is interrupted, its environmental information must be preserved. In order to avoid time-consuming and complex environmental information exchanges from task to task in such cascaded interruptions, an task chaining apparatus ensures a permanent search of the hierarchized priority tasks for chained interrupts and executions and the storing of the environmental information of an interrupted task into storing locations pertaining to the interrupted task proper.

6 Claims, 2 Drawing Figures

HIERARCHIZED PRIORITY TASK CHAINING APPARATUS IN INFORMATION PROCESSING SYSTEMS

BRIEF SUMMARY OF THE INVENTION

The present invention concerns improvements in or relating to the chained management in information processing systems adapted to perform a plurality of tasks of hierarchized priorities, i.e.:

systems comprising a plurality of processor units which partake a common part, most often a common data store and access facilities thereto and therefrom, the accesses of said units to said common part of the system being provided with hierarchized priorities, systems comprising a processor adapted to perform several distinct tasks of hierarchized priorities of execution, systems, wherein the execution of a programme comprises conditional passages from a routine of said programme to another routine having a higher priority of execution when results significant in this respect are obtained during the execution of a routine in said programme.

In each one of such systems, the execution of a task is interrupted when an event occurs claiming the execution of another task of higher priority than the priority of the first. In the first of the above recited case, such an event is a request of access to the said common part, of a processor unit of a higher priority of access than the processor unit which is connected to said common part at the time of said request. In the second of the above recited case, such an event is a request of execution of a task of higher priority than the one which is being executed at the time of said request. In the third one of the recited cases, the event is the obtention of a result of a routine calling for the immediate execution of another routine in the programme, the subject of the task. Of course, systems may combine the second and third kinds of events.

In any case of interruption, the items constituting the environmental information of the interrupted task at the time instant of the interruption, or more definitely at the time instant of occurrence of the event producing such an interruption, must be preserved so that, once the interrupting task is performed, the execution of the interrupted task may be reinstated at the point of interruption thereof. Up to now, the organization dealing with such interruptions was such that the said environmental information of the interrupted task was transferred to a storing area appertaining to the interrupting task proper. The transfer back operation of such items for reinstalment was imperatively made from special final instructions of the interrupting task. Such an organization presents a serious drawback when several interruptions occur in cascade during the overall operation of the system, which is unfortunately the present more common case in actual practice:— when, during an execution of a task which had interrupted a first lower priority one, an event occurs which calls for the execution of a further task of a priority intermediate between the priorities of the said first interrupted task and the task being executed, said last task will when ending, controls the reinstalment of the environmental information of the first task as normal though, immediately, the intermediate priority intervening event immediately produces a novel interruption whereby the said reinstalled information is transferred into storage locations appertaining the said intermediate priority task; — and so forth from interrupting task to interrupting task. This results in a multiplicity of environmental information exchanges which are finally complex and are certainly time-consuming ones.

It is an object of the invention to provide an interruption control device which eliminates such a drawback.

It is a further object of the invention to provide a task chaining apparatus wherein a permanent search is ensured for defining the priorities of requested tasks and, when a task is completed, for defining the next task to be immediately performed.

DETAILED DESCRIPTION

Figure 1:
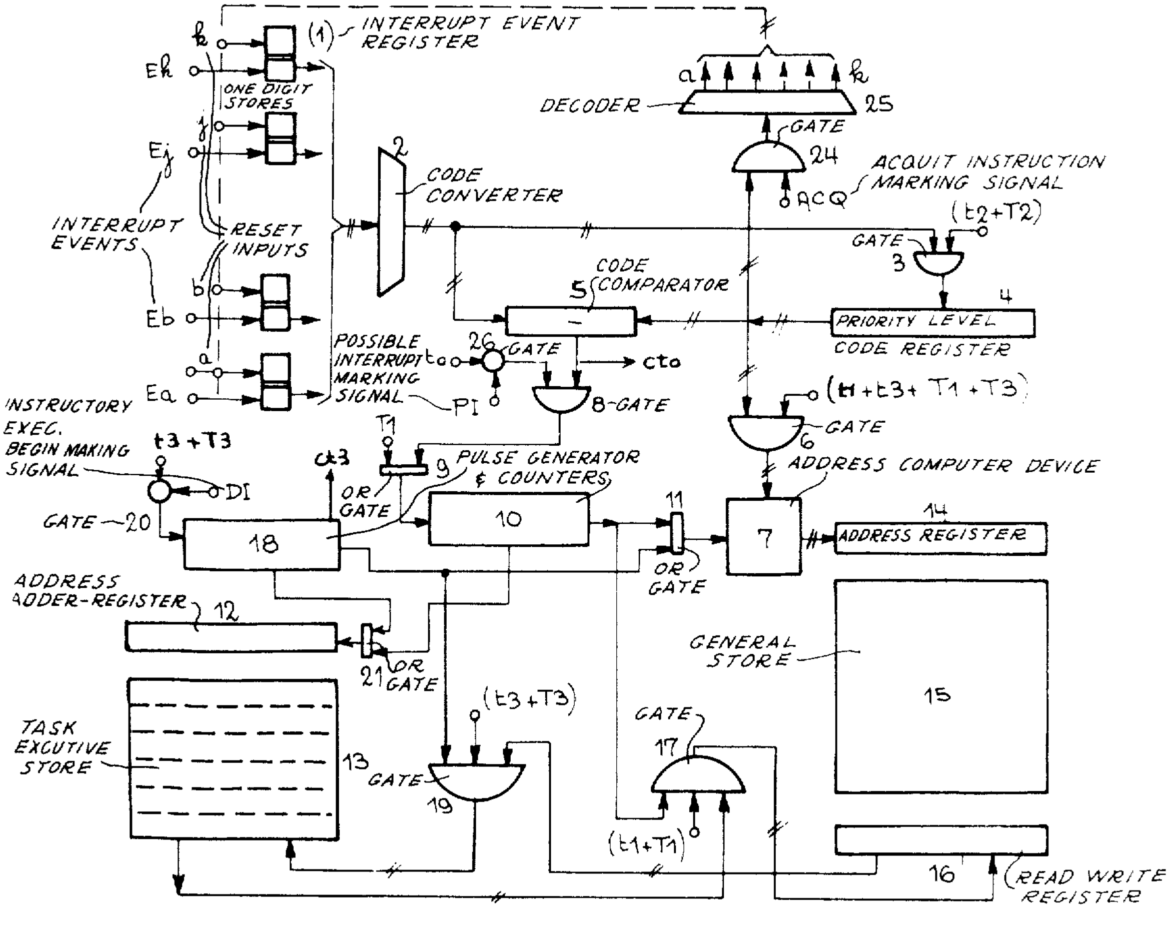
FIG. 1 shows an illustrative example of embodiment of such a device.

In the concerned example, the informations concerning the tasks to be executed are stored in a general store 15 which is organized in addressable each storing the environmental information of a particular task. Said store 15 is conventionally provided with a word address register 14 and a write/read register 16. Each environmental information of a task is, when requested, transferred from the store 15 to an task executive store 13, which is actually the store from which the task items will be dealt with during execution of the said task. The store 13 is provided with a word address register 12. Its read/write register is not shown as unnecessary for the explanation of the invention. Such a transfer is controlled by an sequence pulse forming means 18, the control of which will be hereinunder detailed. Said organization 18 mainly consists of a counter having as many stages as are item registers in the store 13 and a pulse generator for actuation of said counter. Each step of the counter increases by one unit the content of the address register 12 and simultaneously increases by one unit the code of an address which is formed in an operator circuit 7 the output of which is connected to the input of the address register 14 of the general common store 15. Concomitant to each step of counter an unblocking voltage is applied to a group of gates 19. The number of the gates is equal to the number of bits in a word. Each information input of a gate is connected to a bit output of the register 16 and the output of each gate is connected to the input of a column in the store 13, the ranks of the bit being the same in said register 16 and said store 13. As it will be hereinunder described, when the gates 19 are unblocked, any word transferred into the register 16 under the control of the address in 14 will be transferred into the store 13 at the local address present in the register 12 of said store.

Conversely, any environmental information of a task existing in the store 13 and to transfer to store 15 must pass through a group of bit gates 17 under the control of an pulse sequence forming means 10 comprising, similarly to pulse sequence forming means 18, a pulse counter and a pulse generator therefor, said counter being of a number of stages equal to the number of word registers in 13. Each step of the counter controls an advance by one unit of the content of 12 and also an advance by one unit of the address which is being formed in 7 and transferred to 14. The outputs of 18 and 10 are both applied at 21 in a logical OR fashion on the input of the register 12 and at 11 on an input of the operator circuit 7. Each step of the counter also unblocks the gates 17 the information inputs of which receive the bits from the selected register in store 13 and the outputs of which are connected to inputs of same ranks of the read/write register 16 of the store 15. The gates 17 and 19 are unblocked at distinct working phases of operation of the transfers, i.e. phases ($t1$ + T1) for the gates 17 and phases ($t3$ + T3) for the gates 19. Said phases will be hereinunder defined.

Events of hierarchized relative priorities, from $E_a$ to Ek may occur. Each event requests execution of a particular task in a particular environmental information context. When a request is accepted, said environmental information must be transferred from store 15 to store 13 after the preceding environmental information belonging to an interrupted task (or an entirely executed task) is transferred back from 13 to 15. An occurrence of an event requesting execution of a task is memorized on a corresponding two-condition member, for instance a bistable circuit, a part of a register (1) of such members. The outputs of the members (1) are applied to corresponding inputs of a code converter circuit 2 from the output of which permanently issues a code representative of the activated condition of the member of the higher relative priority existing in the said register (1). In the drawing, and as conventionally known, any multiple wire connection is indicated by a couple of transverse lines across the connection line proper. Any code outputting the circuit 2 is applied to a multiple element gate 3 which will introduce it into a register 4 during an operative phase ($t2$ + T2) which will be hereinunder defined, and will unclock said gate 3. A comparator circuit 5, a subtractor circuit in the shown example, receives the codes from 2 and 4 and, when the code existing at the output of 2 is higher than the code existing at the output of 4 (a code significant of the task which is being executed), issues a signal, cto, representative of the fact that a newly requested task is of a higher priority than the one which is being executed. Said output further unblocks a gate 8. Said signal cto is applied to a phase generating arrangement, not shown for simplification of the drawing and which must be understood as conventional with respect to the phase generating circuits of the information systems and machines:— phase to is a phase marking the time interval to wait for a possible interruption of a task, i.e. for instance up to the execution of an instruction in said task or the execution of a microprogramme of operation in said task. As conventional, any end of an execution of an instruction or a micro-programme is marked, in any processing system, by the occurrence of a signal representative of such a condition. Such signals, denoted PI (interruption point, or possible interrupt) are applied to an input of a gate 26 to the other input of which is applied the phase to signal so that, as gate 8 is unblocked, activation of the pulse sequence forming means 10 is ensured, the output of 8 being connected to the activation input of 10 through an OR-circuit 9. Concomitantly, any signal PI terminates the phase to, for instance from a reset of a bistable member which had been activated to work from cto and delivered the phase to signal during its activated condition. A phase $t1$ is initiated, for instance by activation from either PI or the resetting condition of said bistable member, by the activation of a single shot multivibrator which remains set to this activated condition during a time interval corresponding to the complete advance of the counter in 10 the pulse generator of which has been activated from the output signal of 8. The phase $t1$ signal from said single shot multivibrator unblocks a group of gates 6 which transfer the code existing in 4 to the operator circuit 7. As already said, this circuit 7 computes the successive addresses in 15 of the words which must be transferred back from the store 13 to the store 15, gates 17 being also unblocked by the phase $t1$ signal. The progression of the said addresses is ensured from the counter in 10 the stepping pulses of which are applied to an input of 7 through an OR-circuit 11. The progression of the address in the store 13 is ensured, for such a transfer, from the progression of the counter in 10 which, at each step, controls a progression by one unit of the content of 12 through an OR-circuit 21.

The phase signal $t1$ ends with the return of the single shot to its unactivated condition; if desired, the single shot may be synchronised from the output pulse from the last stage of the counter. Said return initiates a phase $t2$ of short length during which through the gates 3 the code existing at the output of 2 is substituted in the register 4 to the code of the interrupted task. Said phase $t2$ may be defined from a further single shot multivibrator cascaded with the one which delivers the phase $t1$ signal. The return to unactivated condition of said further single shot multivibrator initiates a further phase $t3$ for instance by activating a bistable member which will be reset by the output pulse from the counter of pulse sequence forming means 18. During said phase $t3$ and when a signal DI occurs, the phase $t3$ signal is through a gate 20 unblocked by DI, applied to the activation input of 18 and the counter therein progresses up to its maximal count delivering the signal $ct3$ ending said phase $t3$ from desactivation of the said bistable member. Signal DI is a signal which is normally produced in any processing system for marking the beginning of execution of an instruction. During $t3$, gates 6 are unblocked for operation of the circuit 7 which computes the progressive addresses of the words to transfer from 15 to 13, such a progression being controlled from the pulses marking the steps of progression of the counter in 18 and the said counter progression marking pulses are fed to the address register 12 of the store 13 through the OR-circuit 21. Concomitantly the gates 19 are unblocked for such a word per word transfer of a new environmental information from 15 to 13, which has been cleared during phase $t1$ of the interruption operation of the device.

The signal marking the end of phase $t3$ initiates the normal operation of the "interrupting" task the environmental information context is present in the store 13. Such operation is not to be described as outside the scope of the invention, and of course, varying from processing system to processing system. However, the execution of any task, in any system, ends by an apparition of a programme ending instruction, a so-called "release" or "acquit" instruction. The conventional signal which marks such an instruction is used in the device according to the invention for ensuring a prompt chaining of the tasks. This signal is, in this respect, applied for unblocking action, to such gates as 24, wherein the said signal input is marked ACQ ("acquit"). The information inputs of said gates 24 are connected to the outputs of the code register 4, the code content of which marks the level of priority of the task which has been executed. A decoder circuit 25 receives the output signals from the gates 24 and acts for issuing a reset pulse to the one of the bistable members of the group (1) which memorizes the occurrence of that event which had provoked the execution of the task. The outputs from a to k of the decoder 25 correspond to the reset inputs a to k of the bistable members of the group (1). The output of the circuit 2 then marks another priority level code corresponding to the higher priority event which has been memorized on a member of the said group. Said event has a lower priority than the one of the task which has been executed up to its end since, in the contrary case, said executed task would have been interrupted prior its end. The comparator 5 then presents a flase output and it is necessary to have recourse to a further set of operating phases for a further processing operation of the system. The signal ACQ initiates such a set of phases, the first one, T1, is forced through the OR-circuit 9 to the activation input of 10 which ensures the transfer of the environmental information words in 13 back to the store 15 as previously explained in relation to phase *t1* and it must be emphasized that the register 4 still contains the code affected to the executed task. Consequently, the items from the environmental information in store 13 will be transfer back into the store 15 in the zone of said store allotted to said executed task. The length of said phase T1 is that necessary for the counter in 10 to reach its maximal count. Phase T1 produces, when terminated, the activation of a phase T2 which ensures the substitution in the register 4 of the code existing at the output of 2 to the previous content of 4, by unblocking the gate 2 in this respect. Phase T2 produces when ending the initiation of a phase T3 during which the environmental information concerning the new task to be performed is transferred from store 15 to store 13. Said phase T3 ends at the issuance of a signal *ct3* from the organization 18, which signal will initiate the execution of the new task. A more detailed explanation of the production and action of such phases as T1, T2, T3 is not necessary as they are quite similar to those of the previously detailed phases to, *t2* and *t3*.

It is apparent that a task the execution of which is chained to the end instruction of execution of the prior task is solely selected from the condition of the event memorization members (1) and that is solely possible because the environmental information appertaining to a task is automatically transferred, at the interruption and/or end of a task, at the same zone of the store 15 allotted to the task. With the invention, no time consuming and complex operation processing is necessary.

Figure 2:
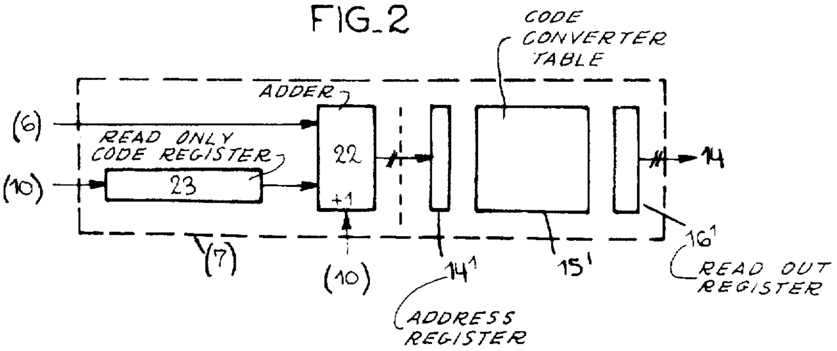
FIG. 2 is a partial view of said embodiment, from which any technological alternative embodiments can be directly deduced.

The addresses of the words which are part of an environmental information of a task are, as said, derived from the priority level code existing in the register 4 at the instants of transfers of said words and which points to a zone of the store 15 alloted to the corresponding task. They are computed in the operator circuit 7 which may, for instance, be such as illustrated in FIG. 2. A code register 23 is loaded with a fixed code which must be added to the code of the priority level from the register 4, through gate 6, in an adder circuit 22 which further receives at each step of the counter in 10, a unit bit pulse whereas, at each such step too, the code of the register 23 is read out in a non-destructive fashion to be applied to the adder 22. The codes issuing from the adder 22 could be directly used for selections in the store 15 but nevertheless, in most cases, a difficulty will occur as concerns the choice of the priority level codes and of the fixed code in 23 and such difficulty is avoid from reading-out by a code issuing from the adder 22, a table of the actual address of the word locations in the store 15 and which is a code converter made of a read-only memory. Such a table is shown at 15'. Any read-out of said table is operated from an intermediate address register 14' receiving the codes from the output of the adder. Any read-out code from 15' is temporarily stored in a register 16' for transmission to the address register 14 of the store 15. Both registers 14' and 16' can serve to an initialization of the content of the table 15' prior the servicing existence of the concerned processing system. the same arrangement also serve for a transfer from 15 to 13 through, of course, the controlling pulses come from the organization 18 instead of 10. In FIG. 2, the inputs marked (10) are to be understood as being truly the output of the OR-circuit 11 of FIG. 1.

In the above described example, the pulse sequence forming means 18 and 10 have been described as comprising each a counter and a pulse generator for said counter, i.e. in a form which may be termed a "hard-wired" one. It must be understood that the invention is not restricted to such an embodiment of the said organizations which may be made of the firmware kind, i.e. consist of parts of prerecorded micro-programmed portions of the instruction store of the system (which instruction store may, obviously, be a part of the general store 15). The modifications to the shown embodiment are as follows: the output of the gate 8 and the input T1 are connected to the input of a conventional request arrangement of execution of a specialized micro-programme of instructions; the output of the gate 20 is similarly connected to an input of another conventional request arrangement of execution of a specialized micro-programme of instructions. Once such a microprogrammation activated, the instructions thereof sequentially control the read-out of the registers 4 and 23, the progression by one unit of the results of addition of the contents of said registers and the read-out of the table 15' as previously explained, together with the progression of the local addresses for the store 13 in the register 12 and the control of unblocking periods for either the gates 17 or the gates 19 as the case may be. Of course, the phase signals are derived from these instructions too. Factually then, in said modification of reduction to practice of the invention, blocks 10 and 18 consist each of a part of the system to which the device is incorporated.

What is claimed is:

1. In an information processing system adapted to perform a plurality of tasks or hierarchized priorities of execution according to the occurrence of as many events each one activating a particular event marking line and comprising a general store organized in zones each one addressable for environmental information of a particular task, a multi-register task executive store and transfer gate connections between said stores for transferring the environmental information from an addressed zone of the general store to the task executive store and back, the combination of:

an event memorizing register made of bit storing members individually connected to the respective event marking lines;

a code converter converting each particular condition of the said event memorizing register into a multibit code significant of the higher priority event memorized in said register and pointing to a particular environmental information zone of the general store;

a multi-bit register capable of storing such a zone pointing code from said converter;

transfer gate means between the output of said converter and the input of said multi-bit register;

a comparator circuit permanently comparing the codes from said converter and said register and having an output activated when the code from said converter marks a higher priority condition than the one from said register;

means responsive to a task acquit signal for resetting in the said event memorizing register the bit storing member marking the event which initiated the acquitted task;

means responsive to the activation of the output of said comparator circuit and delayedly responsive to such a task acquit signal for controlling the transfer of the content of the task executive store to a zone of the general store to which the code in said multi-bit register points;

means responsive to the completion of said transfer for introducing into said multi-bit register the code from the said converter; and means responsive to the completion of said introduction for controlling a transfer of the content of the zone pointed by the code in said register to the said task executive store.

2. A combination according to claim 1, wherein each one of the said transfer controlling means includes means for a step-by-step incrementation of the register addresses of the registers of the task executive store and concomitant incrementation in a step-by-step fashion of the addresses of the locations of the general store within the zone of said store to which the code in said multi-bit register points.

3. A combination according to claim 2, wherein a base code translation circuit is connected between the output of said multi-bit register and the input of the step-by-step incrementation circuit means for the addresses of the locations of the general store.

4. A combination according to claim 1, wherein the output of said comparator circuit to the said transfer controlling means is gated by an interruption authorization signal of the system.

5. A combination according to claim 1, wherein the activation input of said means for controlling a transfer from the general store to the task executive store is gated by a transfer authorization signal of the system.

6. In an information processing system operating to perform a plurality of tasks of hierarchized priorities of execution on the occurrence of as many events each one activating a particular event marking line, comprising a general store organized in zones each one addressable for environmental information of a particular task, a multi-register task executive store of the capacity of a zone of said general store, first gate transfer means controllable for a transfer of the content of the executive store to a zone of the general store addressed in the address register of said store and second gate transfer means controllable for a transfer of the content of an addressed zone of the general store to the executive store, an apparatus for automatically chaining the executions of the tasks in their conditions of occurrences and relative hierarchized priorities comprising the combination of:

an event occurrence memorizing register made of bit storing members individually connected for activation to the respective event marking lines, each such member having an individual reset input, and such members being arranged in said register according to the hierarchized priorities of said events;

a code converter circuit having its input connected to the output of said event memorizing register and responsive to the condition of said register for presenting on its output a code pointing to a particular zone of the general store and significant of the higher priority event memorized in said register;

a register capable of memorizing a code output from said code converter circuit;

decoder means for the content of said register when activated by an acquit signal of a task in the system and having its outputs respectively connected to the reset inputs of the bit storing members of the event memorizing register;

comparator means permanently comparing the codes from said code converter circuit and from said register, having its output activated when the code from the code converter circuit marks a higher priority condition than the one marked by the code in the register;

means gating the output of said comparator means with task possible interrupt signals of the system;

first pulse sequence forming means having an activation input connected to the output of said means and an activation input operative on the occurrence of said acquit signals with a delay enabling such resets of the bit storing members in the event occurrence memorizing register and having pulse outputs to unblocking inputs of the said first gate transfer means and to an address incrementing input of the address register of the task executive store, and having a further pulse output;

gate means connecting the output of the code converter circuit to the input of the code memorizing register activated after each operation of said first pulse sequence forming means;

second pulse sequence forming means having an activation input operative after each operation of said gate means on the occurrence of signals of the system marking an authorization of transfer from the general store to the task executive store, and having pulse outputs to unblocking inputs of the said second gate transfer means and to an address incrementing input of the address register of the task executive store, and having a further pulse output; and a general store address forming circuit having a code receiving input connected to a gated output of said code memorizing register unblocked during the respective operations of the said first and second pulse sequence forming means, having code incrementing input connected to both the said further pulse outputs of the said first and second pulse sequence forming means and having its output connected to an input of the address register of the general store.

* * * * *